2,958,679
Patented Nov. 1, 1960

2,958,679
CROSS-LINKED COPOLYMERS OF UNSATURATED CARBOXYLIC ACIDS AND POLYALKENYL SULFONES

John F. Jones, Cuyahoga Falls, Ohio, assignor to The B. F. Goodrich Company, New York, N. Y., a corporation of New York No Drawing. Filed May 22, 1958, Ser. No. 736,957

7 Claims. (Cl. 260—79.3)

This invention relates to insoluble but hydrophilic thickening and suspending agents and more particularly pertains to interpolymers of alpha-beta olefinically unsaturated monocarboxylic acids and polyalkenyl trimethylene trisulfones and methods for preparing said interpolymers.

This application is a continuation-in-part of copending application of John F. Jones, Serial No. 404,784, filed January 18, 1954.

I have discovered that highly useful carboxylic polymers are obtained when an alpha-beta olefinically unsaturated monocarboxylic acid such as acrylic acid is copolymerized with certain proportions of a polyalkenyl trimethylene trisulfone containing more than one alkenyl group per molecule. The resulting polymers are substantially insoluble in water and in most common organic solvents and are extremely resistant to hydrolytic degradation of the cross-links by strong alkali and acids and the like. Depending upon the polyalkenyl trimethylene trisulfone utilized, however, the polymer properties will vary considerably. With from about 0.1 to about 8% by weight of the polyalkenyl trimethylene trisulfone, insoluble gel-like polymers are obtained which per se, and especially in the form of their alkali metal and ammonium salts, have the ability to absorb large quantities of water with consequent many times increase in volume. Such polymers somewhat resemble, but are greatly superior to gum tragacanth, gum karaya and other naturally occurring more or less insoluble gum-like substances conventionally used as bodying and suspending agents. The high swelling polymers of this invention are extremely useful in various mucilaginous or colloidal gel-like applications such as printing paste thickeners, household polishes, automobile polishes and cleaners and the like.

In the production of the polymers of this invention I employ a mixture of monomers which contains two essential monomeric ingredients, each in certain proportions, one being an alpha-beta olefinically unsaturated monocarboxylic acid such as acrylic acid and the other being a polyalkenyl trimethylene trisulfone which contains more than one alkenyl group per molecule.

The alpha-beta olefinically unsaturated monocarboxylic acids useful in this invention include the acrylic acids such as acrylic acid itself, methacrylic acid, ethacrylic acid, alpha-chloroacrylic acid, alpha-cyanoacrylic acid, and others, crotonic acid, sorbic acid, hydrosorbic acid, and the like and others.

The preferred carboxylic monomers for use in this invention are the monoolefinic acrylic acids having the general structure

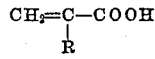

wherein R represents hydrogen, halogen, and cyano groups, monovalent alkyl radicals, monovalent aryl radicals, monovalent aralkyl radicals, monovalent alkaryl radicals and monovalent alicyclic radicals. Of this group acrylic acid itself is most preferred because of its general lower cost, ready availability, and ability to form superior polymers.

The polyalkenyl trimethylene trisulfones useful in this invention are made by the alkenylation of the cyclic compound trimethylene trisulfone. Trimethylene trisulfone, which has the structure

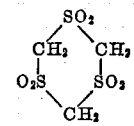

is prepared by the oxidation of symmetrical trithiane with a slight excess of permanganate or hydrogen peroxide. Trimethylene trisulfone is readily converted to the hexa sodium salt which can be subsequently alkenylated with from two to six moles for each mole of trimethylene trisulfone of an alkenyl halide such as allyl bromide, allyl chloride, methallyl bromide, methallyl chloride and the like and others. The most preferred polyalkenylated trimethylene trisulfone for the purpose of this invention because of its relative cheapness and cross-linking efficiency is hexaallyl trimethylene trisulfone.

In the preparation of the polymers embodied in this invention the monomeric mixture of an alpha-beta olefinically unsaturated monocarboxylic acid and polyalkenyl trimethylene trisulfone most preferably is composed of from 0.5 to 6% by weight of the polyalkenyl trimethylene trisulfone.

The polymers of this invention are most preferably made by polymerization in an inert diluent having some solubilizing action on one or more of the monomeric ingredients but substantially none on the resultant polymer. Polymerization in mass may be employed but, however, is not preferred because of the incomplete conversions and the difficulty encountered in the workup of the solid masses obtained. Polymerization in an aqueous medium containing a water-soluble free radical catalyst is useful, the product being obtained either as a granular precipitate or as a highly swollen gel, either of which may be used directly. Polymerization in an organic liquid which is a solvent for the monomers but a non-solvent for the polymer, or in a mixture of such solvents, in the presence of a solvent soluble catalyst is most preferred because the product is usually obtained as a very fine friable and often fluffy precipitate which, after solvent removal, seldom requires grinding or other further treatment before use. Suitable solvents for the latter method include benzene, xylene, tetralin, hexane, heptane, carbon tetrachloride, methyl chloride, ethyl chloride, bromo trichloro methane, and others, and mixtures of these and other solvents.

Polymerization in the diluent medium may be carried out in the presence of a free radical catalyst in a closed vessel in an inert atmosphere and under autogenous pressure or in an open vessel under reflux at atmospheric pressure. The temperature of polymerization may be varied from 0° C. or lower to 100° C. or higher, more preferably 20° C. to 90° C., depending to a large degree on the molecular weight desired in the polymer.

Suitable free-radical catalysts include peroxygen compounds such as sodium, potassium and ammonium persulfates, caprylyl peroxide, benzoyl peroxide, hydrogen peroxide, pelargonyl peroxide, cumene hydroperoxide, tertiary butyl diperphthalate, tertiary butyl perbenzoate, sodium peractetate, sodium percarbonate, and the like as well as azo diisobutyronitrile and others. Other catalysts utilizable are the so-called "redox" type of catalyst and the heavy-metal activated catalyst systems.

The following examples are given to further illustrate the products and process of this invention and are not intended to limit the scope of the invention. The amounts of ingredients, unless otherwise indicated, are given in parts by weight.

Example I

A series of acrylic acid-hexaallyl trimethylene trisulfone copolymers were prepared at 50° C. in a nitrogen atmosphere from the following recipe:

| | |
|---|---|
| Acrylic acid (glacial) | 100 |
| Hexaallyl trimethylene trisulfone | variable |
| Benzoyl peroxide | 2.0 |
| Benzene | 880 |

In about 8 hours complete conversion was obtained in every case. The polymers were isolated by suction filtration followed by air drying at 50° C. Aqueous mucilages were prepared by mixing 1.5 grams of polymer in 100 ml. of distilled water which contained sufficient sodium hydroxide to give a final pH of about 7 to the mucilage. Brookfield viscosities which are expressed in poises were determined on mucilages having various concentrations of polymer.

| Parts Hexaallyl Trimethylene Trisulfone | Viscosities | | |
|---|---|---|---|
| | 1.5% Polymer Conc. | 1.0% | 0.5% |
| 0.5 | 40 | 32 | 12 |
| 0.75 | 120 | 72 | 20 |
| 1.0 | 144 | 96 | 64 |
| 2.0 | 320 | 288 | 192 |
| 3.0 | 1,080 | 1,040 | 800 |
| 4.0 | 724 | 672 | 528 |
| 5.0 | 2,000 | 1,600 | 1,280 |
| 6.0 | 2,832 | 2,304 | 880 |

A sample of 80 g. of a 0.05% mucilage of the above polymer having 0.75 part hexaallyl trimethylene trisulfone was homogenized with 20 g. of titanium dioxide powder and the resulting suspension remained homogeneous throughout for two months at room temperature in a closed container.

In a manner similar to that described above acrylic acid-hexamethallyl trimethylene trisulfone, methacrylic acid-hexaallyl trimethylene trisulfone and methacrylic acid-hexamethallyl trimethylene trisulfone copolymers were prepared and evaluated. In general these polymers were comparable to the acrylic acid-hexaallyl trimethylene trisulfone copolymers in thickening efficiency and suspending power.

It is obvious that many changes and modifications can be made in the above-described details without departing from the nature and spirit of the invention, therefore it is to be understood that the invention is not limited to said details except as set forth in the appended claims.

The embodiments of the invention in which an exclusive property or privilege is claimed are defined as follows:

1. The composition comprising an interpolymer of an alpha-beta olefinically unsaturated monocarboxylic acid having from 3 to 4 carbon atoms inclusive and from 0.5 to 6 parts by weight based upon the weight of said acid of a hexalkenyl trimethylene trisulfone.

2. The interpolymer of acrylic acid and from 0.5 to 6 parts by weight based on the weight of acrylic acid of hexaallyl trimethylene trisulfone.

3. The interpolymer of acrylic acid and from 0.5 to 6 parts by weight based on the weight of acrylic acid of hexamethallyl trimethylene trisulfone.

4. The interpolymer of methacrylic acid and from 0.5 to 6 parts by weight based on the weight of methacrylic acid of hexaallyl trimethylene trisulfone.

5. The interpolymer of methacrylic acid and from 0.5 to 6 parts by weight based on the weight of methacrylic acid of hexamethallyl trimethylene trisulfone.

6. The interpolymer of an alpha,beta-olefinically unsaturated monocarboxylic acid having the structure

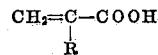

wherein R is a member selected from the class consisting of hydrogen and a hydrocarbon group having from 1 to 6 carbon atoms and from 0.5 to 6 parts by weight based on the weight of said acid of a hexaalkenyl trimethylene trisulfone wherein the alkenyl substituents are selected from the class consisting of allyl and methallyl groups.

7. The method for preparing the interpolymer of an alpha,beta-olefinically unsaturated monocarboxylic acid having the structure

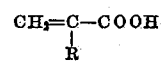

wherein R is a member selected from the class consisting of hydrogen and a hydrocarbon group having from 1 to 6 carbon atoms and from 0.5 to 6 parts by weight based on the weight of said acid of a hexaalkenyl trimethylene trisulfone wherein the alkenyl substituents are selected from the class consisting of allyl and methallyl groups, said method comprising conducting the polymerization in an organic diluent and from 20° C. to 100° C. in an inert atmosphere in the presence of a free-radical initiator.

References Cited in the file of this patent

UNITED STATES PATENTS

| | | |
|---|---|---|
| 2,591,020 | Smith | Apr. 1, 1952 |
| 2,794,014 | Dreisbach et al. | May 28, 1957 |